United States Patent Office 3,539,533
Patented Nov. 10, 1970

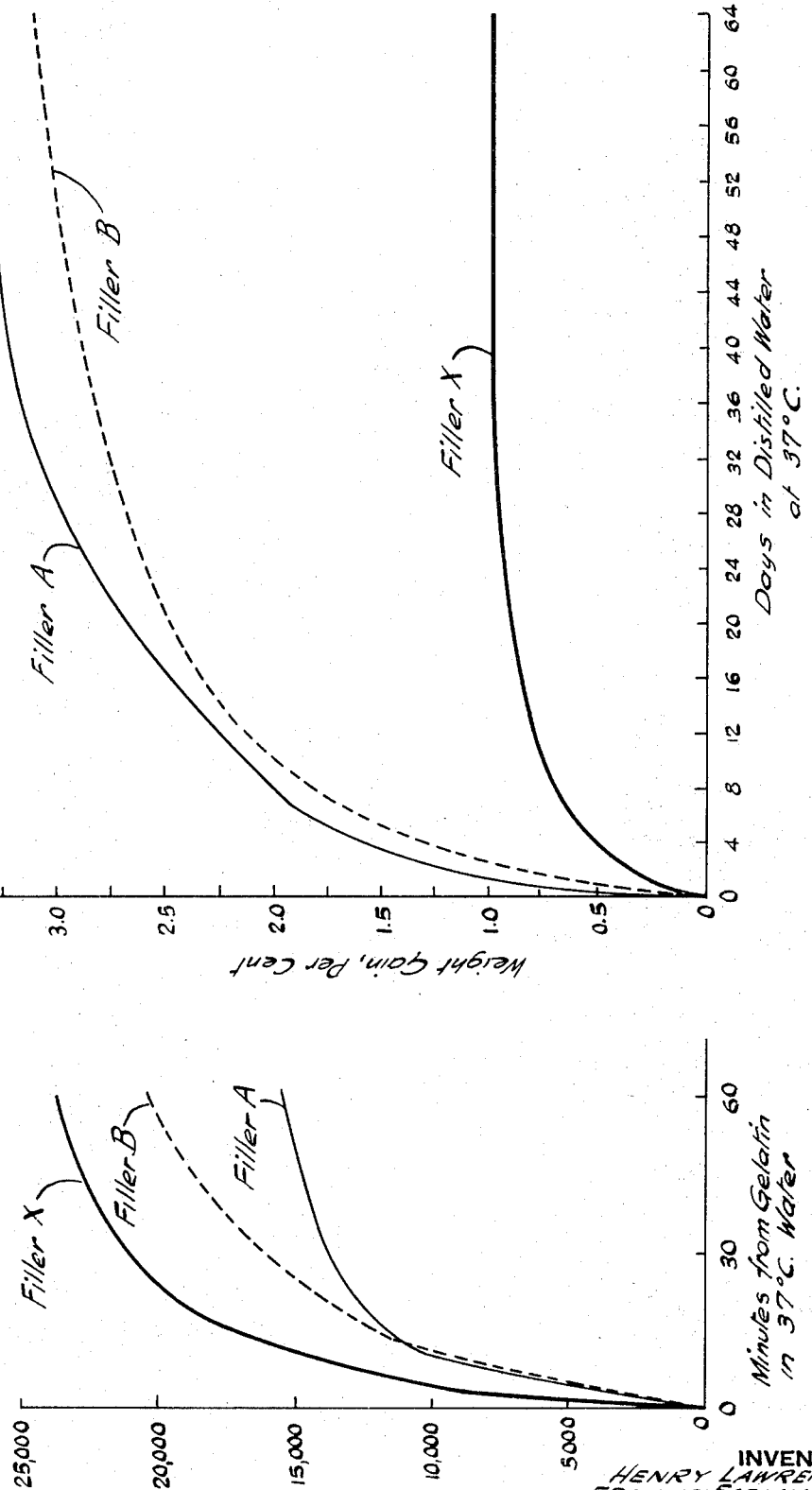

3,539,533
DENTAL FILLING MATERIAL
Henry Lawrence Lee II, San Marino, Francis Fabian Smith, Los Angeles, and Michael Lawrence Swartz, Encino, Calif., assignors to Johnson & Johnson, a corporation of New Jersey
Filed June 14, 1968, Ser. No. 737,228
Int. Cl. C08g *33/10;* C09k *3/00*
U.S. Cl. 260—47                    15 Claims

ABSTRACT OF THE DISCLOSURE

Direct filling materials for the filling of teeth are prepared utilizing a cross-linked organic binder having a finely divided inorganic filler therein wherein the filler is present in the composite in amounts in excess of 70 percent by weight. The major portion of the binder is formed through the polymerization of a monomer mix of bis phenol A backbone monomers comprising

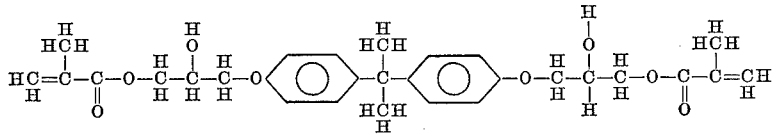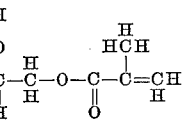

(hereinafter called BIS-GMA) and bis phenol A dimethacrylate. Diluent reactive monomers may be used to obtain the most desirable viscosity for blending with the inorganic filler. The preferred compositions contain together with the bis phenol A backbone monomers relatively small amounts of triethylene glycol dimethacrylate as the reactive diluents with small amounts of methacrylic acid. The preferred systems also utilize as an activator for the binder system a nitrogen compound having the general formula:

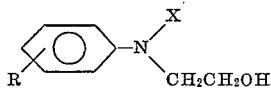

where R may be either —H or —CH$_3$ and X may be —CH$_2$CH$_2$OH, —C$_2$H$_5$ or —CH$_3$ the preferred activator being p-tolyl diethanolamine.

DESCRIPTION OF INVENTION

In U.S. Pat. No. 3,066,112 is described direct filling material utilizing, as the main component in the binder resin, the monomer

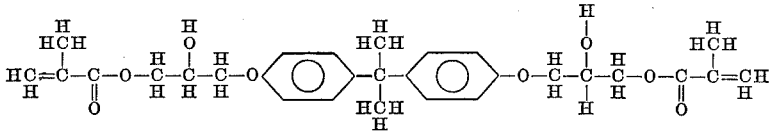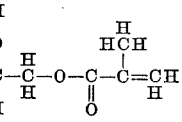

As previously indicated, this monomer will hereinafter be referred to as BIS-GMA. The patent describes the use of BIS-GMA as the basic monomer in the binder system but indicates the necessity to reduce the viscosity of the same through the addition of reactive diluents such as methyl methacrylate, ethylene glycol dimethacrylate, and tetraethylene glycol dimethacrylate. The patentee utilizes as an activator for his binder system either dimethyl para-toluidine or para-toluenesulfinic acid. Benzoyl peroxide or other suitable catalyst is used to catalyze the polymerization reaction.

Although the dental filling materials described in U.S. Pat. No. 3,066,112 have many advantages over previously available acrylic restoratives, particularly in the area of increased strength, in practical application numerous problems are encountered. One of these is the relatively large amount of methacrylic acid found necessary to include in the binder system to obtain a rate of cure which would make the filling materials practical from the standpoint of handling by a dentist. The presence of the methacrylic acid, in the amounts needed, raised irritation problems as well as problems with respect to stability of the resin binder system prior to use preparation of the dental filling.

In order for a dental filling system to be practical commercially, the respective components must have a relatively long shelf life as it may be many months after manufacture and packaging before actual use by the dentist in his office. A binder system which has partially polymerized during this period will give nonuniform results with respect to fillings prepared depending on the degree of polymerization having occurred in storage. It is thus important that any system have a shelf life of at least six months to be practical.

Also, in preparing a dental filling the dentist must have a reasonable period of time to mix the ingredients and place them in the tooth cavity prior to their hardening to a point where the same cannot be readily molded and formed. This time is generally in the order of one to three minutes. However, the binder system must also cure sufficiently rapidly that a high degree of strength is reached by the filling in a relatively short time after the filling has been inserted otherwise damage to the same may occur.

As the filling, once inserted, remains in a continuously wet environment due to the presence of saliva it should have substantial resistance to water absorption.

It has now been discovered that direct dental filling materials having all of the advantages of the filling materials of U.S. Pat. No. 3,066,112 but having improved properties thereover are obtanied if there is included in the binder system together with the BIS-GMA the monomer bisphenol A dimethacrylate. By so modifying the bisphenol A backbone monomer content of the binder system appreciably faster overall cure rates are obtained resulting in substantially higher compressive strength in shorter periods of time, while still providing time for preparation of the filling by the dentist. Also, the water-absorption properties of the final filling are improved, the fillings containing the bisphenol A dimethacrylate absorbing appreciably less water.

A still further advantage resulting through the inclusion of bisphenol A dimethacrylate in the binder system together with the BIS-GMA is that appreciably lower amounts of methacrylic acid or other relatively volatile active monomers are needed with resulting reduction in possible irritation to the pulpal tissue.

Although various reactive diluent monomers may be used in obtaining the viscosity best suited for admixing relatively large amounts of finely divided inorganic filler, the preferred reactive diluent is triethylene glycol dimethacrylate, inclusion of the same in the binder system containing the BIS-GMA and bisphenol A dimethacrylate give filling matrices having excellent compressive strengths, compressive strengths as high as 35,000 being obtained.

In the preferred practice of the present invention the bisphenol A dimethacrylate is included in the binder resin in amounts of .05 to .2 part bisphenol A for each part by weight BIS-GMA present. The total of bisphenol A backbone monomers should comprise at least 85% by weight of the total monomer mix.

When using binding resins containing only BIS-GMA as the bisphenol A backbone monomer, relatively low compressive strengths are obtained during the first few hours after filling preparation indicating that poor curing is being obtained. When bisphenol A dimethacrylate is used as the only bisphenol A backbone monomer the resin obtained is extremely friable and satisfactory dental fillings are not obtained. In addtion, as the bisphenol A dimethacrylate is a white powder at room temperatures, its physical characteristics do not lend themselves to easy handling which is necessary in order to obtain a satisfactory filling material that can be used by dentists. However, when the bisphenol A dimethacrylate is blended with BIS-GMA in the proportion hereinafter indicated, resin binder systems having excellent physical properties are obtained.

When the bisphenol A dimethacrylate is present with the BIS-GMA in amounts of about 33 percent of the total, bisphenol A dimethacrylate-BIS-GMA content, it is found that some of the bisphenol A dimethacrylate may crystallize, thus presenting a nonhomogeneous mixture and possible handling difficulties. However, dental fillings having excellent strength can still be obtained. This problem of crystallization can, however, be avoided and excellent binder systems still be obtained through the reduction of the amount of bisphenol A dimethacrylate used.

In the preferred direct filling compositions an activator of the class designated by the formula

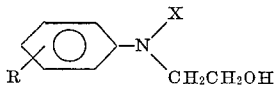

where R may be either —H or $CH_3$ and X may be —$C_2CH_2OH$, —$C_2H_5$ or —$CH_3$ is used; the preferred activator being p-tolyl diethanolamine. It has been discovered that the presence of such activators in the binder system improve the stability of the binder monomers during storage prior to use as well as improving the overall cure rate of the resin and color stability in the cured dental filling.

The inorganic filler used is important with respect to the overall physical properties of the dental filling, the same being present in amounts of about 65 to 75 percent by weight of the filling and preferably present in amounts in excess of 70 percent. However, improvement in physical properties is obtained with any particular filler when practicing the present invention over properties resulting from use of the same filler with a binder system using only BIS-GMA as the bisphenol A backbone monomer.

For the inorganic filler any of the materials silica, glass beads, aluminum oxide, crystalline quartz, and the like may be used. The particle size may range from about 2 to 85 microns with the preferred size being within the range of about 5 to 75 microns. The finely divided inorganic filler should be treated with a keying agent to improve the binding of the resin thereto. The keying agents described in Bowen Pat. No. 3,066,112 are well suited for this purpose although other keying agents suitable to the organic polymer may be used. Those found to be particularly suitable are the high performance ethylenically unsaturated organo silane compounds such as gamma-methacryloxypropyltrimethoxysilane, vinyltrichlorosilane, vinyltriethoxysilane, vinyltrimethoxysilane, and vinyltriacetoxysilane.

Although aluminum oxide in the form of fused alumina having a particle size of 10 to 50 microns gives excellent compressive strength, it may not be desirable to use the same in preparing anterior dental fillings as dental fillings using aluminum oxide, due to its extreme hardness and abrasive characteristics, can pick up marks from a metal utensil when rubber against the same thus making such dental fillings, from the standpoint of appearance, possibly undesirable where such markings might become visible to a casual observer. However, because of the excellent wear resistance of fillings obtained using fused alumina, such fillings are highly suitable for filling teeth where any marking, through the contact with utensils, is less likely to occur. and if it should occur would not be visibly apparent to the casual observer.

Where more translucent filling materials are desired, as for the filling of anterior teeth, glass beads, or a mixture of glass beads and quartz may be used.

As previously indicated, the inorganic filler is treated with a keying agent suitable for increasing the bond to the organic polymer.

One suitable method of preparation is that described in Bowen Pat. No. 3,066,112. According to this method, the filler is treated with an aqueous solution of tris(2-methoxyethoxy) vinyl silane catalyzed with sodium hydroxide to give a pH of 9.3 to 9.8, one-half percent of the silane per weight of inorganic filler, where, for example, the same is fused quartz, being used.

The BIS-GMA monomer may be prepared, for example, by any of the methods disclosed in the heretofore mentioned Bowen Pat. No. 3,066,112. The bisphenol A dimethacrylate modified BIS-GMA part of the binder system, hereinafter referred to as the bisphenol A conomer content, should comprise at least 85 percent by weight of the whole binder system. The remaining active monomer content of the binder system is made up of so-called reactive diluents which may be any acrylate or methacrylate monomer which when added will reduce the viscosity of the binder system so that it can readily be blended with the finely divided inorganic filler. Among these are the difunctional and polyfunctional acrylates and methacrylates and include the monomers methyl methacrylate and the glycol dimethacrylates such as the ethylene through tetraethylene glycol dimethacrylate with the preferred reactive diluent monomer being triethylene glycol dimethacrylate. The reactive diluent monomer or monomers are generally present in amounts of 8 to 15 percent by weight of the binder system. A small amount of methacrylic acid is preferably included. The amount generally not being in excess of 2 percent and generally being present in an amount of 1 to 2 percent by weight based on the weight of the binder. As previously indicated, in order to obtain a rapid initial set after blending by the dentist, a polymerization activator is included. The activator is generally included in amounts of 0.1 to 2 percent based on the weight of active monomers present. Although various activators may be used, as previously indicated, inclusion of an activator of the class

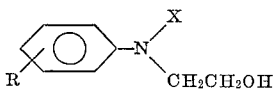

where R may be either —H or —$CH_3$ and X may be —$CH_2CH_2OH$, —$C_2H_5$ or —$CH_3$ the preferred activator being p-tolyl diethanolamine, gives unexpected and substantial improvement over results obtained where using, for example, the activators of U.S. Pat. No. 3,066,112.

The improvement in the binder system through the inclusion of bisphenol A dimethacrylate with the BIS-GMA as opposed to using the BIS-GMA alone is well illustrated by FIGS. 1 and 2. In the graphs of these figures two commercially available direct filling materials identified as Filler A and Filler B, using binder systems containing BIS-GMA alone as the bisphenol A backbone monomer are compared with direct filling materials of the present invention identified as Filler X which utilizes a binder system containing the BIS-GMA modified with bisphenol A dimethacrylate. The rapid attainment of high strength in the filling materials of the present invention, as illustrated by Filler X, over the others is well illustrated in FIG. 1. It will be observed that after the initial 30 minutes after mixing, the fillings of the present invention exhibit substantially greater crushing strength than the others. This is important with respect to avoiding damage to the filling. The substantial improvement as to low water absorption found in the fillings of the present invention is well illustrated in the graph of FIG. 2 where like designations are used to identify the direct filling material. Referring to the graph of FIG. 2 it will be noted that the amount of water absorption of restorative resin binders utilizing only BIS-GMA Filler A and B, as the bisphenol A content of the resin is several times the amount of water absorption obtained where a resin binder system is used in which the bisphenol A backbone resin content is made up through the inclusion of bisphenol A dimethacrylate together with BIS-GMA monomer Filler X.

The practice of the present invention is further illustrated by the following example. The example, however, is given for the purpose of illustration only, and the invention is not limited thereto.

EXAMPLE

Fused quartz sand is ground in a porcelain ball mill to a size that will pass through a 200 mesh screen. 500 g. of this ground quartz is placed in 1000 ml. of 20% hydrochloric acid and heated to 80° C. for 1 hour. The acid is filtered off and the pigment washed with water until the effluent reaches a pH of 6 to 7. The pigment is dried in an open glass tray at 130° C. A water solution of silane is prepared by placing 0.4 ml. acetic acid and 10 g. of trimethoxysilylpropyl methacrylate in 200 g. of water and stirring rapidly at room temperature. A slurry is prepared of the pigment and the silane solution. The slurry is placed in a glass tray and evaporated to dryness at 130° C. The mixture is stirred frequently during the drying process.

The resin binder is compounded by placing 14.7 g. of bisphenol A dimethacrylate in 133 g. of BIS-GMA and heating briefly in a 130° C. oven to obtain complete solution. To this is added 17.3 g. triethylene glycol dimethacrylate, 3.54 g. methacrylic acid, 0.15 g. 2,6-di-tert-butyl-p-cresol, and 2.0 g. of N,N-di-(2-hydroxyethyl)-p-toluidine. The mix is stirred slowly until solution is complete. The binder and filler are then mixed by slowly stirring the 500 grs. of the silane treated filler into the resin mixture until a uniform dispersion is obtained.

A catalyst solution is prepared by dissolving 5 g. of benzoyl peroxide in 100 grs. of triethylene glycol dimethacrylate.

The filling material is prepared by mixing one drop (approximately .03 gr.) of the catalyst solution with 1 g. of the binder-filler mix. Mixing is done with a small spatula of wood, plastic or porcelain. After mixing for 30 seconds the compound gels in 60 to 70 seconds and becomes very hard in about 2½ minutes. For purposes of physical testing, samples of the filling material are placed in 37° C. water at this point and maintained there until the moment of testing.

After 24 hours the filling material has a compression strength of 26,000 p.s.i., a flexural modulus of 1 million p.s.i., and a Rockwell H hardness of 100.

Cavities in teeth are prepared for receiving fillings. Using a binder-filler mix and a catalyst solution prepared as described filling material is prepared by mixing one drop of the catalyst solution with 1 gram of the binder-filler mix. The filling material thus prepared is immediately placed in the prepared cavities. The filling material shortly after insertion sets into a hard permanent filling.

Particular embodiments of the invention have been used to illustrate the same. The invention, however, is not limited to these specific embodiments. In view of the foregoing disclosure, variations and modifications thereof will be apparent, and it is intended to include within the invention all such variations and modifications except as do not come within the scope of the appended claims.

Having thus described our invention, we claim:

1. A polymerizable binder, suitable for use as the binder resin in direct dental filling materials consisting essentially of bisphenol A backbone monomers and active diluent acrylic monomers wherein the bisphenol A backbone monomers make up at least 85 percent by weight of the binder and consist of a mixture of BIS-GMA and bisphenol A dimethacrylate the bisphenol A dimethacrylate being present in amounts of 0.05 to 0.33 part by weight for each part by weight of BIS-GMA.

2. A polymerizable binder of claim 1 in which said diluent acrylic monomer is at least one of the group consisting of difunctional and polyfunctional acrylates and methacrylates and which contains 1.0 to 2.0 percent by weight of methacrylic acid based on the weight of said binder.

3. A polymerizable binder of claim 2 wherein said active diluent acrylic monomer is triethylene glycol dimethacrylate.

4. A polymerizable binder of claim 3 in which said bisphenol A dimethacrylate is present in amounts of 0.05 to 0.2 part by weight for each part by weight of BIS-GMA present.

5. In a direct dental filling system utilizing a binder and finely divided solid filler, a binder of bisphenol A backbone monomers and active diluent acrylic monomers wherein the bisphenol A backbone monomers make up at least 85 percent by weight of the binder and consist of a mixture of BIS-GMA and bisphenol A dimethacrylate, the bisphenol A dimethacrylate being present in amounts of .05 to 0.33 part by weight for each part by weight of BIS-GMA.

6. In a direct dental filling system of claim 5 in which the active diluent acrylic monomer of said binder is of the group consisting of difunctional and polyfunctional acrylates and methacrylates and which contains 1 to 2 percent by weight of methacrylic acid based on the weight of said binder.

7. A direct dental filling system of claim 6 in which the active diluent acrylic monomer is triethylene glycol dimethacrylate.

8. A direct dental filling system of claim 7 in which the bisphenol A dimethacrylate is present in said binder in amounts of 0.05 to 0.2 part by weight for each part by weight of BIS-GMA present.

9. A direct dental filling material comprising a finely divided inorganic filler and a binder for binding together said inorganic filler said binder consisting essentially of bisphenol A backbone monomer and active diluent acrylic monomers wherein the bisphenol A backbone monomers make up at least 85 percent by weight of the binder, a peroxide catalyst and an activator for producing free radicals upon reacting with said peroxide catalyst, said activator being a nitrogen compound having the general formula

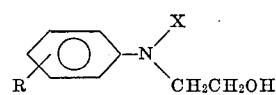

where R is —H or —CH$_3$, and X is —CH$_2$CH$_2$OH, —C$_2$H$_5$, or —CH$_3$.

10. A direct filling material of claim 9 in which said bisphenol A backbone monomer consists of a mixture of BIS-GMA and bisphenol A dimethacrylate the bisphenol A dimethacrylate being present in amounts of 0.05 to 0.33 part by weight for each part by weight of BIS-GMA.

11. A direct filling material of claim 10 in which the active diluent acrylic monomer of said binder is of the group consisting of difunctional and polyfunctional acrylates and methacrylates and which contains 1 to 2 percent by weight of methacrylic acid based on the weight of said binder.

12. A direct filling material of claim 11 in which the active diluent acrylic monmoer is triethylene glycol dimethyacrylate.

13. A direct filling material of claim 12 in which said bisphenol A dimethacrylate is present in amounts of 0.05 to 0.2 part by weight for each part by weight BIS-GMA present.

14. A direct filling material of claim 12 in which the activator is p-tolyl diethanolamine.

15. A direct filling material of claim 14 in which said bisphenol A dimethacrylate is present in amounts of 0.05 to 0.2 part by weight for each part by weight BIS-GMA present.

References Cited

UNITED STATES PATENTS

| 2,558,139 | 6/1951 | Knock | 260—78.4 |
| 3,066,112 | 11/1962 | Bowen | 260—41 |

FOREIGN PATENTS

| 657,894 | 2/1963 | Canada. |

JOSEPH L. SCHOFER, Primary Examiner

C. A. HENDERSON, Jr., Assistant Examiner

U.S. Cl. X.R.

32—15; 106—35; 260—41